3,255,171
PURIFICATION OF RECYCLE ETHYLENE IN THE HIGH PRESSURE POLYMERIZATION OF ETHYLENE
Hans Eilbracht, Rudi-Heinz Rotzoll, and Hans-Georg Trieschmann, Ludwigshafen (Rhine), and Friedrich Urban, Limburgerhof, Pfalz, Germany, assignors to Badische Anilin- & Soda-Fabrik Aktiengesellschaft, Ludwigshafen (Rhine), Germany
Filed Aug. 23, 1962, Ser. No. 218,907
Claims priority, application Germany, Aug. 26, 1961, B 63,794
2 Claims. (Cl. 260—94.9)

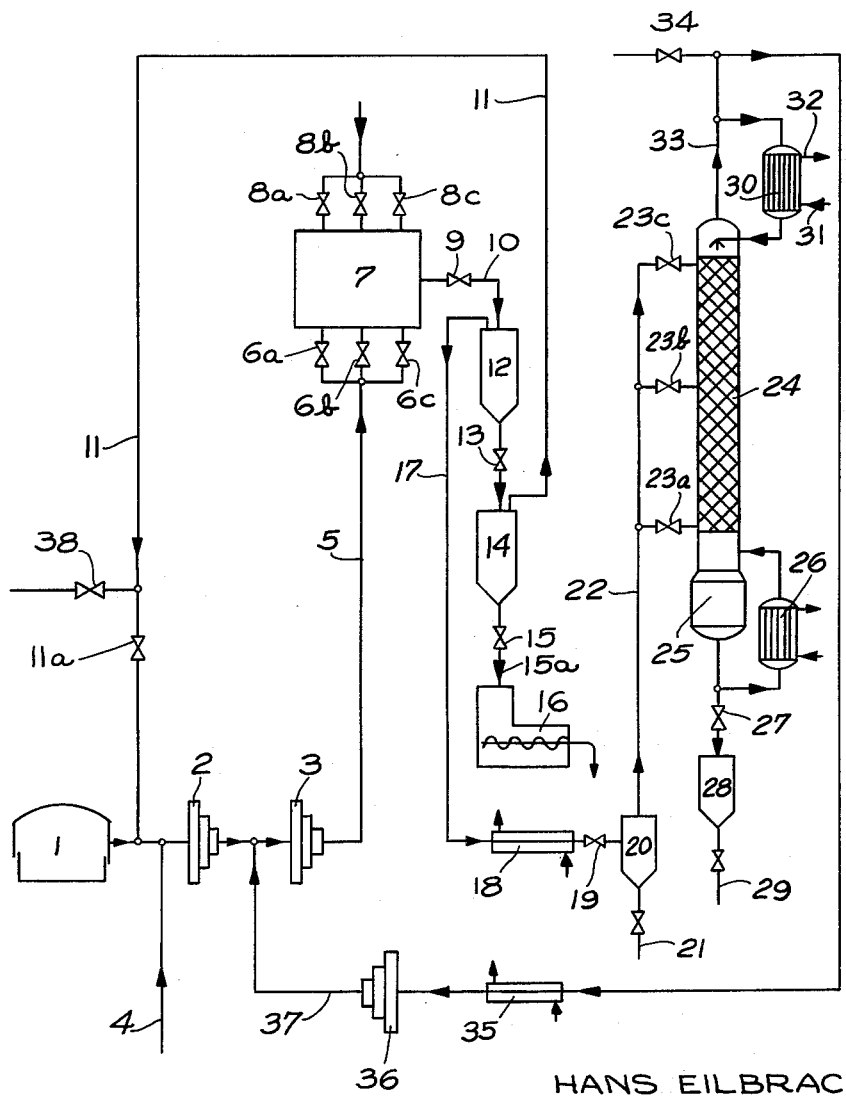

This invention relates to the high pressure polymerization of ethylene. More specifically, it relates to a process for the purification of the recycle ethylene from byproducts forming during the polymerization and from small amounts of solvents which may be present.

Several technical methods are known for the polymerization of ethylene at pressures between about 1,000 and 4,000 atmospheres using catalysts, such as oxygen or peroxides. In all these methods, only part of the compressed ethylene is polymerized during a single passage through the reactor. In order to separate the polyethylene formed from the unreacted ethylene and from byproducts and any solvents, the reaction mixture must be expanded to a lower pressure. Various technical methods are known for this purpose. For example, it has been proposed to expand the reaction mixture to 200 to 300 atmospheres to separate the polyethylene from unreacted ethylene. The bulk of the unreacted ethylene in this known method is separated from the polyethylene under the said pressure and then recirculated to compressors and compressed to 1,000 to 4,000 atmospheres together with fresh ethylene feed. Expansion to a pressure between about 200 and 300 atmospheres has the disadvantage that a large part of the byproducts formed in the polymerization remains dissolved in the compressed ethylene. The recycle ethylene thus becomes enriched with byproducts which either impair the properties of the polyethylene or, if discharged, cause undesirably high losses of ethylene. In another prior art method, the recycle ethylene is expanded to about normal pressure after the polyethylene has been separated. Although in this case a somewhat larger proportion of the byproducts formed in the process is separated, the recycle ethylene still contains comparatively large amounts of byproducts whose vapor pressure cannot be disregarded even at room temperature. Moreover, expansion to normal pressure has the disadvantage that the whole of the recycle ethylene has to be compressed again from normal pressure to 1,000 up to 4,000 atmospheres.

It is the object of this invention to provide a process for the purification from troublesome impurities of recycle ethylene in the high pressure polymerization of ethylene, which process does not exhibit the above-mentioned disadvantages.

We have found that recycle ethylene in the high pressure polymerization of ethylene can be advantageously purified after high molecular weight polyethylene has been separated therefrom by washing it with liquid ethylene. The washing of the recycle ethylene should be carried out at a pressure below 50.9 atmospheres. In general, a pressure from 20 to 50 atmospheres is preferred and the washing of the recycle ethylene is most effective and economic in this range. In some instances, a pressure below 20 atmospheres down to normal pressure, i.e., 1 atmosphere, can be used, but working at such pressures is less economical. The high molecular weight polyethylene separated has in general a molecular weight of more than 20,000, for example between about 35,000 and 70,000 (measured according to Überreither, "Makromolekulare Chemie," volume 8, 1952, pages 21 to 28). It is preferred to use 5 to 20% by weight of liquid ethylene with reference to the amount of ethylene to be purified, i.e., to the total amount of unreacted ethylene and byproducts. In some instances, for example, when the recycle ethylene contains only a comparatively small amount of impurities, it is possible to use less than 5% liquid ethylene. In general, however, the results are unsatisfactory when using less than 5% of liquid ethylene. On the other hand, it is possible to use more than 20% by weight of liquid ethylene, for example between 30 and 50 or even 70% or more, but amounts below 5 to 20% are in genral less economical. The ethylene to be purified in general contains altogether up to about 0.5% by weight of low molecular weight polymers of ethylene with molecular weights of less than 1,000, olefins, such as 2-ethylbutene-(1), ketones and aldehydes. The ethylene to be purified may also contain small amounts, generally up to about 10% by weight, of organic solvents. Only those solvents are suitable whose melting point is below 0° C., especially saturated aliphatic, cycloaliphatic and aromatic hydrocarbons, particularly those having five to ten carbon atoms, for example, pentane, hexane, methylcyclohexane, octane, isooctane, 2-ethylhexane, decane, toluene, ethylbenzene and diethylbenzenes; alcohols, especially monohydric alkanols with 1 to 4 carbon atoms, for example, methanol, ethanol, propanol, isopropyl alcohol, butanol-(1) and butanol-(2), alkanols derived from butanes and pentanes, ketones, especially aliphatic and cycloaliphatic ketones having three to six carbon atoms, such as acetone, methyl ethyl ketone and diethyl ketone, cyclohexanone, and aliphatic carboxylic acid esters, such as ethyl acetate.

The purification is advantageously carried out in a wash column, liquid ethylene being passed in countercurrent to the gaseous ethylene. Purified ethylene can then be withdrawn at the top of the wash column and the impurities drawn off from the bottom of the column. The pressure of the ethylene in the wash column is less than 50.9 atmospheres, advantageously between 20 and 50 atmospheres. The best results are obtained by using a pressure between 25 and 40 atmospheres. The temperature of the liquid ethylene depends on the pressure prevailing in the wash column and in general is between $-25°$ and $0°$ C., preferably between $-20°$ and $-3°$ C.

Fresh liquid ethylene may be used for the process. It is particularly advantageous, however, especially from an economic point of view, to liquefy a portion, preferably 5 to 20% by weight, of the unreacted ethylene containing the impurities and obtained after separating the polyethylene and then to wash the remainder of the gaseous unreacted ethylene with the liquefied ethylene. It is especially advantageous to pass the liquefied ethylene in countercurrent to the remainder of the gaseous unreacted ethylene in a wash column. Liquefaction may be effected for example by removing heat by means of an external cooling cycle. It is, however, also possible to carry off such an amount of heat from the ethylene by expansion and utilization of the Joule-Thompson effect that the desired amount of ethylene is liquefied.

It is preferred to purify by the process all, i.e., 100%, of the recycle ethylene. In some instances, however, it is sufficient to purify with liquid ethylene only a portion, but at least 25% by weight of the recycle ethylene. The remainder of the recycle ethylene may then be mixed without purification with fresh compressed ethylene and recirculated to the reactor.

The invention will now be described in greater detail with reference to the accompanying drawing which illustrates a preferred embodiment of the invention:

Fresh ethylene from a gas holder 1 is compressed by means of compressors 2 and 3 to the pressure desired for the polymerization, i.e., about 1,000 to 4,000 atmospheres. If oxygen is used as catalyst, this may be supplied for example through a pipe 4 on the suction side of compressor 2. The compressed ethylene containing catalyst is introduced into a reactor 7 through a pipe 5 and valves 6a, 6b and 6c at one or more points. If desired, catalyst may be added to one or more points of the reactor 7 through further valves 8a, 8b and 8c. The polyethylene formed leaves the reactor 7 with the unreacted ethylene through a valve 9. The reaction mixture is expanded therein to a pressure between about 200 and 400 atmospheres and then passed through a pipe 10 into a separator 12 in which the unreacted ethylene is separated. The polyethylene still containing a small amount of unreacted ethylene is passed through a valve 13 into another separator 14 and expanded to a pressure between normal pressure and about 20 atmospheres. The residual ethylene, which has thus been separated practically completely, is passed through a pipe 11 and a valve 11a to the suction side of the compressor 2 and added to the fresh ethylene. The polyethylene is passed from the separator 14 through a valve 15 and a pipe 15a into an extruder 16 in which it is granulated in conventional manner. The recycled unreacted ethylene, which leaves the separator 12 through a pipe 17, is cooled in a cooler 18 to about 80° to 100° C. and expanded through a valve 19 to a pressure between normal pressure and 50.9 atmospheres. It is preferably expanded to 45 to 50 atmospheres at this point. Some of the impurities thus separate in a separator 20 and may be discharged through a valve 21. The ethylene is then passed through a pipe 22 and valves 23a, 23b and 23c at a suitable point, preferably at the bottom, into a wash column 24 which may be packed and in which a pressure between 25 and 40 atmospheres is maintained. In the column 24, the gaseous ethylene flows countercurrent to a portion of the ethylene which has been liquefied in a heat exchanger 30 by means of a suitable coolant, for example liquid ammonia, which may be circulated through pipes 31 and 32. The remaining impurities in the gaseous ethylene are thereby washed out by the liquid ethylene. The liquid ethylene is passed from the bottom 25 of the wash column 24 into an evaporator 26 in which it is evaporated again. The impurities of higher boiling point washed out from the gaseous ethylene become enriched in the bottom 25 and may be removed from the system through a separator 28 and valves 27 and 29. Purified ethylene is supplied through a pipe 33 and a heat exchanger 35 to a compressor 36 which compresses it to the same pressure as that to which fresh ethylene is compressed by the compressor 2. The compressed and purified ethylene is then passed through a pipe 37 to the suction side of the compressor 2 and mixed there with fresh compressed ethylene. Inert gases and uncondensed portions may be removed with ethylene if necessary through valves 34 and/or 38.

According to the present invention it is possible to remove practically all troublesome impurities from the recycle ethylene. The ethylene can be purified far better in this way than by expanding it to normal pressure at normal temperature. It is possible to control the temperature in the reactor considerably better by reason of the higher purity of the recycle ethylene. Moreover it is surprising that the conversion in the reactor can be increased and the properties of the polyethylene formed can be improved by this measure. For example the polyethylene formed contains less low molecular weight components; in particular, it contains less impurities which impart an unpleasant odor to the polyethylene. Sheets which have been prepared from polyethylene by blow moulding exhibit very good transparency and have practically no tendency to stick and block.

What we claim is:

1. In a process for the production of high molecular weight polyethylene by polymerizing ethylene at a pressure between 1,000 and 4,000 atmospheres, separating the polyethylene from the unreacted ethylene, and recycling the unreacted ethylene after separation from the polyethylene, the improvement which comprises washing 25% to 100% by weight of the recycled ethylene containing up to 0.5% by weight of impurities comprising low molecular weight polymers of ethylene with molecular weights of less than 1000, 2-ethyl-butene-(1), ketones and aldehydes at a pressure between 20 and 50 atmospheres with liquid ethylene at a temperature between —25° C. and 0° C. and thereby removing from the recycled ethylene gas the byproduct impurities resulting from the polymerization of ethylene.

2. A process as claimed in claim 1 wherein 5 to 20% by weight of the unreacted, recycled ethylene is liquefied and the remainder of the unreacted gaseous ethylene is washed with the liquefied ethylene.

References Cited by the Examiner

UNITED STATES PATENTS 1,958,553   5/1934   Van Nuys _____ 260—677
2,852,501   9/1958   Richard et al. _____ 260—94.9

JOSEPH L. SCHOFER, *Primary Examiner.*

MORRIS LIEBMAN, WILLIAM H. SHORT,
*Examiners.*